(12) United States Patent
Cho

(10) Patent No.: US 9,558,016 B2
(45) Date of Patent: Jan. 31, 2017

(54) PLATFORM SYSTEM, METHOD FOR CHANGING SUPPORT HARDWARE CONFIGURATION OF UNIVERSAL EXTENSIBLE FIRMWARE INTERFACE BASIC INPUT OUTPUT SYSTEM AND COMPUTER PROGRAM PRODUCT

(71) Applicant: INSYDE SOFTWARE CORP., Taipei (TW)

(72) Inventor: Cheng-Da Cho, Taipei (TW)

(73) Assignee: INSYDE SOFTWARE CORPORATION, Taipei (TW)

( * ) Notice: Subject to any disclaimer, the term of this patent is extended or adjusted under 35 U.S.C. 154(b) by 121 days.

(21) Appl. No.: 14/543,631

(22) Filed: Nov. 17, 2014

(65) Prior Publication Data

US 2015/0186161 A1 Jul. 2, 2015

(30) Foreign Application Priority Data

Nov. 18, 2013 (TW) .............................. 102141851 A

(51) Int. Cl.
*G06F 15/177* (2006.01)
*G06F 9/445* (2006.01)
*G06F 9/44* (2006.01)

(52) U.S. Cl.
CPC ......... *G06F 9/44505* (2013.01); *G06F 9/4401* (2013.01)

(58) Field of Classification Search
CPC .................................. G06F 9/44; G06F 9/443
USPC ............................................................. 713/2
See application file for complete search history.

(56) References Cited

U.S. PATENT DOCUMENTS

| 7,698,546 | B2* | 4/2010 | Stemen ................. | G06F 9/4411 709/223 |
| 2004/0015685 | A1* | 1/2004 | Chen ......................... | G06F 8/65 713/1 |
| 2007/0006199 | A1* | 1/2007 | Huang .................... | G06F 9/545 717/162 |
| 2007/0101115 | A1* | 5/2007 | Murakami ............... | G06F 8/65 713/1 |
| 2012/0260077 | A1* | 10/2012 | Harmer ................. | G06F 9/4443 713/1 |
| 2015/0186161 | A1* | 7/2015 | Cho ....................... | G06F 9/4401 713/2 |

* cited by examiner

*Primary Examiner* — Vincent Tran
(74) *Attorney, Agent, or Firm* — Muncy, Geisler, Olds & Lowe, P.C.

(57) ABSTRACT

A method for changing a support hardware configuration of a universal extensible firmware interface basic input output system (UEFI BIOS) is provided, and the change method is performed by a platform system. The method includes the following steps: in a boot stage, copying binary data of a setup menu in the UEFI BIOS to a memory or a storage medium, where a program of the setup menu to be displayed on a user interface is written in a visual forms representation (VFR) format, and a compiler compiles the program of the setup menu into the binary data of the setup menu in an internal forms representation (IFR) format; and writing a piece of address data to the UEFI BIOS, where the address data is used to query a location at which the binary data of the setup menu stored in the memory or the storage medium is located.

7 Claims, 3 Drawing Sheets

PLATFORM SYSTEM, METHOD FOR CHANGING SUPPORT HARDWARE CONFIGURATION OF UNIVERSAL EXTENSIBLE FIRMWARE INTERFACE BASIC INPUT OUTPUT SYSTEM AND COMPUTER PROGRAM PRODUCT

BACKGROUND

Technical Field

The present invention relates to a basic input output system, and in particular, to a platform system, a method for changing a support hardware configuration of a universal extensible firmware interface basic input output system, a record medium, and a computer program product.

Related Art

A basic input output system (BIOS) refers to a flash memory stored on a main board, includes basic subprograms input and output by many platform systems, such as a computer, a tablet computer, or a smart mobile phone, and is set on the main board for processing communication between software and hardware. Setting of the BIOS is related to hardware of the platform system. For example, if a BIOS on a main board of a platform system is changed randomly, it is possible to cause that the platform system cannot be started.

A BIOS functions to set and control operations of a central processing unit (CPU) and various related chips, and set a clock and operations of peripheral apparatuses in various standards, for example, a printer, a mouse, a keyboard, a hard drive, and a soft drive. When the BIOS starts the platform system, the BIOS may firstly determine whether all peripheral apparatuses operate in right locations, and then load an operating system from the hard drive or a magnetic disk drive into a dynamic random access memory (DRAM). With the BIOS, the operating system and an application program can use detailed information of input and output apparatuses by using the BIOS, for example, a network card medium address control (MAC) address, and a capacity and a location of the magnetic disk drive. If the apparatus is changed, the operating system or the application program is informed only by changing the BIOS.

Before the platform system leaves a factory, a firmware engineer or a testing engineer enterssetup menu into setup menu by pressing a hot key, so as to change configuration setting of the BIOS, or achieves a function of changing configuration setting of the BIOS by changing binary data of the BIOS.

However, in the conventional manner of changing configuration setting of the BIOS, the firmware engineer or the testing engineer must press the hot key to perform change, and this manner is not beneficial for testing automation; in addition, by changing configuration setting of a large number of BIOSs in a manual manner, it is difficult to avoid generation of a problem of change omission; moreover, the testing engineer must fully understand meanings and locations represented by various fields before changing configuration setting of the BIOS, causing difficulties for the testing engineer to change the configuration setting of the BIOS.

SUMMARY

In view of the foregoing problem, the present invention provides a platform system, a method for changing a support hardware configuration of a universal extensible firmware interface basic input output system (UEFI BIOS), a record medium, and a computer program product. The UEFI BIOS informs, by using a user interface, a firmware engineer or a testing engineer of setting options that can be adjusted, and of candidate values, which can be selected for use, of the setting options, the firmware engineer may also write firmware to parse information provided by the user interface, so as to achieve an automation function of modifying configuration setting of a BIOS. Therefore, human intervention is not needed when the firmware engineer or the testing engineer modifies the configuration setting of the UEFI BIOS, which is conducive to avoid a human error; in addition, the testing engineer can easily change the configuration setting of the UEFI BIOS without the need of possessing background knowledge related to the UEFI BIOS.

According to a first aspect of the present invention, a method for changing a support hardware configuration of a UEFI BIOS is provided, where the change method is performed by a platform system, and includes the following steps:

in a boot stage, copying binary data of a setup menu in the UEFI BIOS to a memory or a storage medium, where a program of the setup menu to be displayed on a user interface is written in a visual forms representation (VFR) format, and a compiler compiles the program of the setup menu into the binary data of the setup menu in an internal forms representation (IFR) format; and writing a piece of address data to the UEFI BIOS, where the address data is used to query a location at which the binary data, which is stored in the memory or the storage medium, of the setup menu is located.

According to a second aspect of the present invention, a computer program product storing a program is provided, where after a platform system loads the program into the computer program product and executes the program, the change method of the first aspect of the present invention can be implemented.

According to a third aspect of the present invention, a platform system is provided, including:

a UEFI BIOS, including a piece of address data; and a storage medium, used to: in a boot stage, store binary data of a setup menu that is in the UEFI BIOS, where a program of the setup menu to be displayed on a user interface is written in a VFR format, and a compiler compiles the program of the setup menu into the binary data of the setup menu in an IFR format;

where the address data is used to query a location at which the binary data, which is stored in storage medium, of the setup menu is located.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

To make persons of ordinary skill in the prior art further understand the present invention, content of the present invention and effects to be achieved are described in details by listing preferable embodiments in the following and with reference to the accompanying drawings.

Figure 1:
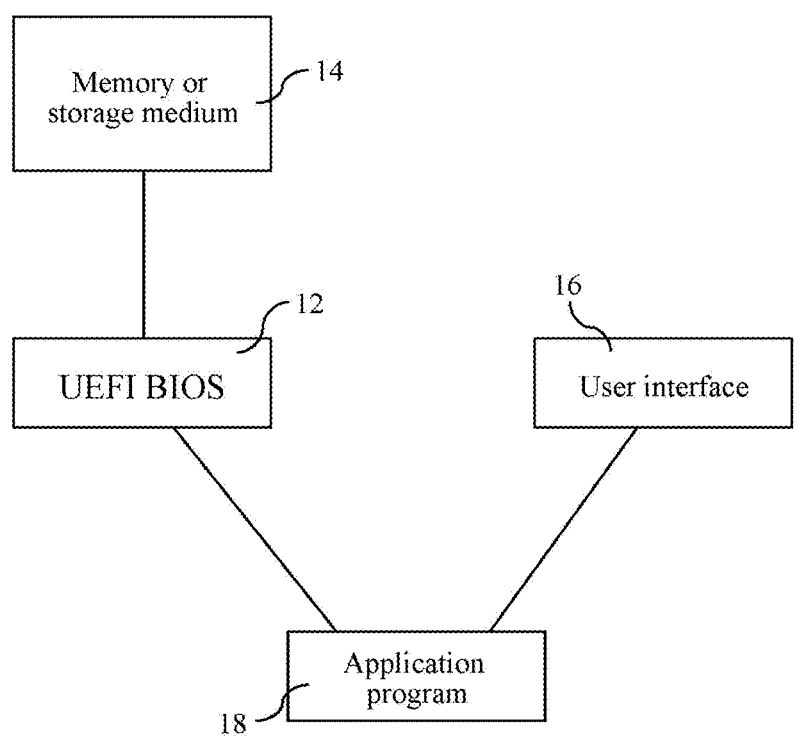
FIG. 1 is a schematic block diagram of a support hardware configuration used to change a UEFI BIOS according to the present invention.

FIG. 1 is a schematic block diagram of a support hardware configuration used to change a UEFI BIOS according to the present invention. In FIG. 1, a platform system 10 such as a computer, a tablet computer, or a smart mobile phone includes a UEFI BIOS 12, a memory or storage medium 14, and a user interface 16.

In a boot stage, the platform system 10 can perform data access on the memory or storage medium 14; in an operating system stage, the platform system 10 executes an application program, and a firmware engineer or a testing engineer changes configuration setting of the UEFI BIOS 12 on a setup menu displayed on the user interface 16.

The UEFI BIOS 12 has a piece of address data. In a boot stage, the storage medium 14 stores binary data of a setup menu that is in the UEFI BIOS 12, where a program of the setup menu to be displayed on the user interface is written in a VFR format, and a compiler compiles the program of the setup menu into the binary data of the setup menu in an IFR format. The address data is used to query a location at which the binary data, which is stored in the storage medium 14, of the setup menu is located.

A processing apparatus (such as a CPU) reads the address data in the UEFI BIOS 12, so as to point to the location at which the binary data, which is in the memory or storage medium 14, of the setup menu is located. The processing apparatus parses the binary data of the setup menu to convert into a setup menu of a pure text format, so as to display the setup menu on the user interface.

A user changes a parameter of the support hardware configuration on the setup menu that is on the user interface, and the platform system 10 generates a piece of configuration parameter change data. The processing apparatus reads a piece of configuration data in the UEFI BIOS 12, and changes a part of data in the configuration data according to the configuration parameter change data, so as to establish changed configuration data. The processing apparatus determines whether the changed configuration data conforms to functional characteristics of the platform system 10, so as to write the changed configuration data to the UEFI BIOS 12. The processing apparatus determines, by using a system management interrupt (SMI) process, whether the changed configuration data conforms to the functional characteristics of the platform system 10.

Figure 2:
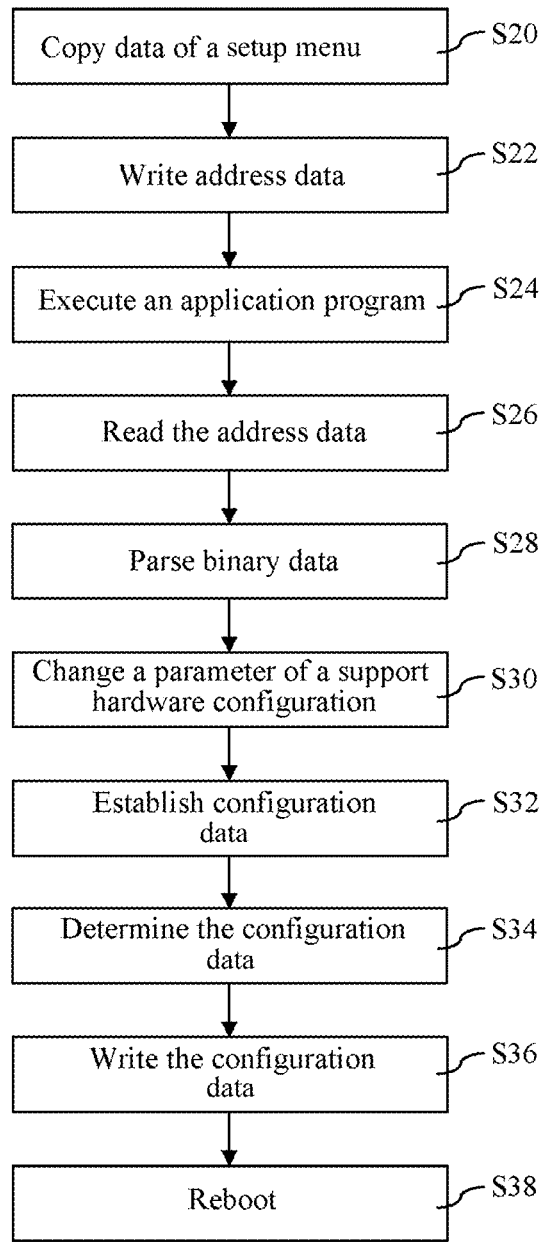
FIG. 2 is a flowchart of a method for changing a support hardware configuration of a UEFI BIOS according to the present invention.

FIG. 2 is a flowchart of a method for changing a support hardware configuration of a UEFI BIOS according to the present invention. When steps in FIG. 2 are described, reference is made to components in FIG. 1.

Figure 3:
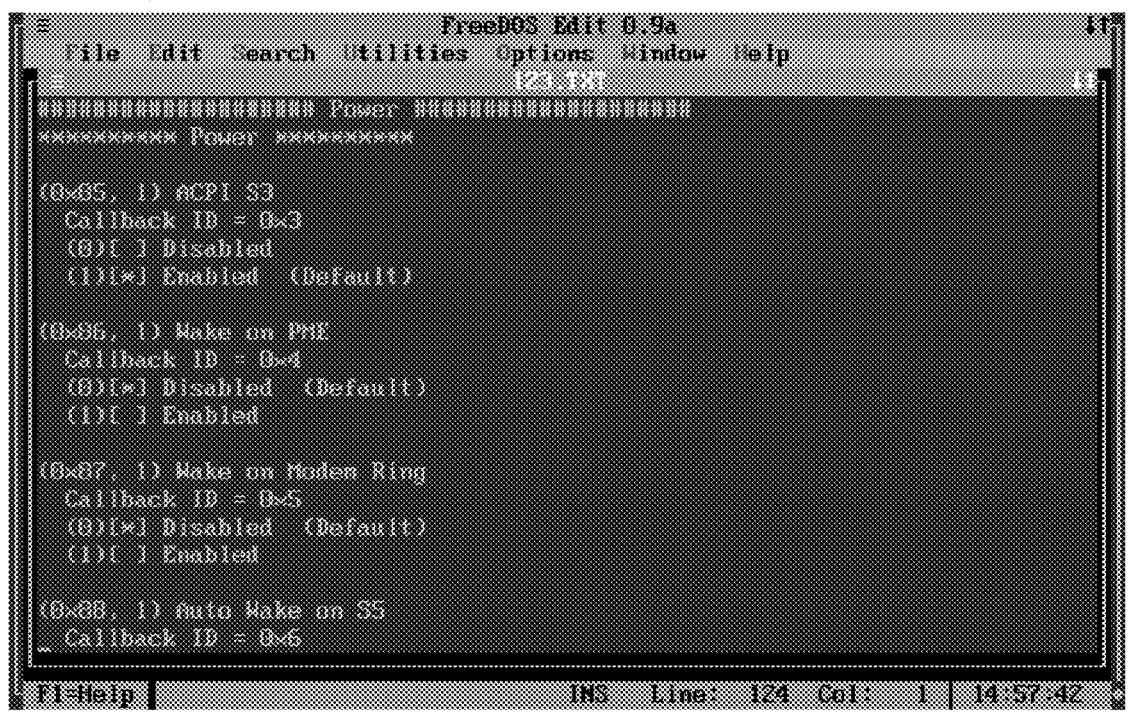
FIG. 3 is a schematic diagram of a setup menu according to the present invention.

In FIG. 2, before a platform system 10 such as a computer, a tablet computer, or a smart mobile phone leaves a factory, a firmware engineer or a testing engineer changes and tests configuration setting of a UEFI BIOS 12. Firstly, in a boot stage, the platform system 10 copies binary data of a setup menu (shown in FIG. 3) in the UEFI BIOS 12 to a memory or storage medium 14 (step S20).

The firmware engineer writes a program of the setup menu which is displayed on a user interface 16 in a VFR format, and in a BIOS compiling process, a VfrCompile public program used as a compiler compiles, in an IFR format, the program of the setup menu of the VFR format into the binary data of the setup menu, and writes the binary data to the UEFI BIOS 12.

When copying the binary data of the menu image to the memory or storage medium 14, the platform system 10 may know that the binary data is copied to a piece of address data in the memory or storage medium 14, so that the address data is written to the UEFI BIOS 12 (step S22). The address data is used to query a location at which the binary data, which is copied to the memory or storage medium 14, of the setup menu is located.

After completing a boot process, the platform system 10 enters an operating system stage, and the platform system 10 executes an application program, so as to perform steps, to be described in the following, of a method for changing a support hardware configuration of a UEFI BIOS 12 (step S24).

The executed application program is displayed on the user interface 16 for calling the setup menu, and the platform system 10 reads, by using an SMI process, the address data written to the UEFI BIOS 12, so as to point to the location at which the binary data, which is in the memory or storage medium 14, of the setup menu is located (step S26).

A system management mode (SMM) is an execution mode of a CPU in which x86 chip architecture is introduced by the Intel Corporation after 386SL. The SMM can enter a basic input output system (BIOS) only by using the SMI, and exit the BIOS only by executing a resume from system management mode (RSM). For an operating system, the SMM is transparent. In other words, the operating system does not know when the system enters the SMM at all, and cannot know by querying that the SMM is executed. To implement the SMM and provide a function of hardware SMI, the Intel Corporation newly adds a pin SMI# Pin to a CPU thereof, and when the pin is at a high potential, the CPU may enter the mode. When the SMM executes a process, other processes are shielded, including all interrupts of the CPU. A process executed by the SMM is referred to as an SMM processing process, and all SMM processing processes can only run in space called system management RAM (SMRAM). The SMM processing process can only be implemented by system firmware.

The executed application program parses the binary data of the setup menu according to a process specified in Chapter 28.3 in Specification UEFI 2.3.1, to convert to a setup menu (shown in FIG. 3) of a pure text format, so that the setup menu is displayed on the user interface 16 (step S28). The setup menu of the pure text format enables the firmware engineer or the testing engineer to read and change configuration setting easily.

The firmware engineer or the testing engineer performs operations of changing all or a part of parameters of the support hardware configuration on the setup menu that is on the user interface 16, so as to generate a piece of configuration parameter change data (step S30). The configuration parameter change data is stored in the memory or storage medium 14 in a file form.

The platform system 10 reads a piece of configuration data in the UEFI BIOS 12, and changes a part of data in the configuration data according to all or a part of changed configuration parameter change data of the support hardware configuration, so as to establish changed configuration data (step S32). The established changed configuration data is stored in the memory or storage medium 14 in a file form.

After the changed configuration data is established, for the executed application program, the platform system 10 determines, by using the SMI process provided by the UEFI BIOS 12, whether the changed configuration data conforms to functional characteristics of the platform system 10 (such as a resource conflict problem) (step S34).

The platform system 10 writes the changed configuration data to the UEFI BIOS 12 (step S36). The platform system 10 executes a service provided by the UEFI BIOS 12 (for example, IHISI: Insyde H2O Internal Soft-SMI Interface) to write the changed configuration data to the UEFI BIOS 12.

The executed application program triggers a reboot process in a software boot manner, and the platform system 10 reboots by using the UEFI BIOS 12 with the changed configuration data (step S38).

The method for changing a support hardware configuration of the UEFI BIOS according to the present invention may be implemented in a form of a program, and the program can be stored in a record medium. After a computer loads the program into the record medium and executes the program, the method steps shown in the foregoing descriptions and figures can be implemented.

Similarly, the method for changing a support hardware configuration of a UEFI BIOS according to the present invention may be implemented by a computer program product, and after the computer downloads the computer program product from a network, for example, and executes the computer program product, the method steps shown in the foregoing descriptions and figures can be implemented.

The present invention provides a method for changing a support hardware configuration of a UEFI BIOS, a record medium, and a computer program product. The UEFI BIOS informs, by using a user interface, a firmware engineer or a testing engineer of setting options that can be adjusted, and of candidate values, which can be selected for use, of the setting options, the firmware engineer may also write software to parse information provided by the user interface, so as to achieve an automation function of modifying configuration setting of the UEFI BIOS. Therefore, human intervention is not needed when the firmware engineer or the testing engineer modifies the configuration setting of the UEFI BIOS, which is conducive to avoid a human error; in addition, the testing engineer can change the configuration setting of the UEFI BIOS more easily without the need of possessing background knowledge related to the UEFI BIOS.

Even though the present invention is described with reference to preferable embodiments and exemplary accompanying drawings in the foregoing, the present invention is not limited thereto. Any modification, omission, and change made to the aspects and embodiments by persons skilled in the prior art shall fall within the scope of the claims of the present invention.

What is claimed is:

1. A method for changing a support hardware configuration of a universal extensible firmware interface basic input output system (UEFI BIOS), wherein the change method is performed by a platform system, and comprises the following steps:

in a boot stage, copying binary data of a setup menu in the UEFI BIOS to a memory or a storage medium, wherein a program of the setup menu to be displayed on a user interface is written in a visual forms representation (VFR) format, and a compiler compiles the program of the setup menu into the binary data of the setup menu in an internal forms representation (IFR) format;

writing a piece of address data to the UEFI BIOS, wherein the address data is used to query a location at which the binary data, which is stored in the memory or the storage medium, of the setup menu is located;

in an operating system stage, executing an application program to perform the following steps:

reading the address data in the UEFI BIOS, so as to point to the location at which the binary data, which is stored in the memory or the storage medium, of the setup menu is located;

parsing the binary data of the setup menu to convert into a setup menu of a pure text format, so as to display the setup menu on the user interface;

changing a parameter of the support hardware configuration on the setup menu that is on the user interface, so as to generate a piece of configuration parameter change data;

reading a piece of configuration data in the UEFI BIOS, and changing a part of data in the configuration data according to the configuration parameter change data, so as to establish changed configuration data;

determining whether the changed configuration data conforms to functional characteristics of the platform system; and writing the changed configuration data to the UEFI BIOS.

2. The change method according to claim 1, wherein the executing an application program to perform the steps further comprises: rebooting by using the UEFI BIOS with the changed configuration data.

3. The change method according to claim 1, comprising a step of executing a system management interrupt (SMI) process to determine whether the changed configuration data conforms to the functional characteristics of the platform system.

4. The change method according to claim 1, wherein the established changed configuration data is stored in the storage medium in a file form.

5. A computer product storing a program, wherein after the platform system loads the program into the computer program product and executes the program, the program causes the platform system to perform the change method according to any one of claims 1 and 3 to 4.

6. A platform system, comprising:

a universal extensible firmware interface basic input output system (UEFI BIOS), comprising a piece of address data; and a non-transitory storage medium, used to: in a boot stage, store binary data of a setup menu that is in the UEFI BIOS, wherein a program of the setup menu to be displayed on a user interface is written in a visual forms representation (VFR) format, and a compiler compiles the program of the setup menu into the binary data of the setup menu in an internal forms representation (IFR) format; and a processing apparatus, used to read the address data in the UEFI BIOS, so as to point to the location at which the binary data, which is in the memory or the storage medium, of the setup menu is located; parse the binary data of the setup menu to convert into a setup menu of a pure text format, so as to display the setup menu on the user interface; change a parameter of a support hardware configuration on the setup menu that is on the user interface, so as to generate a piece of configuration parameter change data; read a piece of configuration data in the UEFI BIOS, and change a part of data in the configuration data according to the configuration parameter change data, so as to establish changed configuration data; determine whether the changed configuration data conforms to functional characteristics of the platform system; and write the changed configuration data to the UEFI BIOS;

wherein the address data is used to query a location at which the binary data, which is stored in storage medium, of the setup menu is located.

7. The platform system according to claim 6, wherein the processing apparatus determines, by using a system management interrupt (SMI) process, whether the changed configuration data conforms to the functional characteristics of the platform system.

* * * * *